United States Patent
Fitzpatrick

[11] 3,768,341
[45] Oct. 30, 1973

[54] CHAIN SAW SHARPENING DEVICE

[76] Inventor: James W. Fitzpatrick, Potomac, Mont. 59862

[22] Filed: Dec. 17, 1971

[21] Appl. No.: 209,294

[52] U.S. Cl. .............................. 76/31 R, 76/25 A
[51] Int. Cl. ..................... B23d 63/08, B23d 63/00
[58] Field of Search ................... 76/25, 36, 36 A, 76/31, 25 A

[56] References Cited
UNITED STATES PATENTS

| | | | |
|---|---|---|---|
| 3,038,355 | 6/1962 | Granberg | 76/31 |
| 2,932,993 | 4/1960 | Weatherly et al. | 76/36 A |
| 2,762,241 | 9/1956 | Nielson | 76/31 |
| 2,818,752 | 1/1958 | Granberg | 76/31 |
| 2,833,165 | 5/1958 | Irwin et al. | 76/31 |
| 3,313,184 | 4/1967 | Granberg | 76/31 |

*Primary Examiner*—Harrison L. Hinson
*Attorney*—Harvey B. Jacobson

[57] ABSTRACT

A support structure including a base for removable securement to the bar of a chain saw with the bar extending in a first direction and disposed in a first plane. The base includes an adjustable longitudinally extendible support arm supported at one end from the base for oscillation about an axis transverse to the arm and the plane in which the associated chain saw bar is disposed. The base is oscillatable between a first limit position with the arm extending generally normal to the bar and a second position inclined relative to that limit position. A support head is supported from the other end of the arm for adjustable oscillation about an axis generally paralleling the arm and the mount is supported from the head for adjustable angulation about an axis transverse to the axis of oscillation of the head. Also, an elongated file support assembly includes means for stationarily supporting an elongated file therefrom with the file extending longitudinally of the support assembly and the support assembly is supported from the mount for oscillation about and guided shifting along an axis extending longitudinally of the support assembly.

8 Claims, 5 Drawing Figures

CHAIN SAW SHARPENING DEVICE

The chain saw sharpening device of the instant invention has been primarily designed to provide a means whereby the teeth of a chain saw chain may be properly sharpened. The sharpening device includes structure whereby it is adapted for use in conjunction with different size chain saw chains. Further, the sharpening device has been designed so that the angle of the sharpening file may be varied from approximately 30° relative to the associated chain saw bar to approximately 45° relative to the bar whereby different angles may be formed on the cutting teeth of the saw chain according to different kinds of timber to be cut. Further, the sharpening device includes structural features thereof that enable each cutting tooth to be sharpened exactly the same amount whereby the associated chain saw, after being sharpened, will cut efficiently and evenly through timber.

In addition to the sharpening device being capable of performing exactly the same sharpening operation on each cutter tooth, the sharpening device may also be utilized in conjunction with a triangular file in order to precisely control and alter the projection of the depth gauges of the saw chain relative to the cutting teeth. Accordingly, the cutting teeth as well as the depth gauges may be precisely filed with each tooth being sharpened in exactly the same manner and each depth gauge being filed in exactly the same manner in order to obtain a chain saw chain which is constant throughout its length and which will therefore not only cut efficiently but in an extremely smooth manner, just as though the saw chain was new.

The main object of this invention is to provide a chain saw sharpening device which may be readily utilized to sharpen a chain saw chain while supported from a chain saw bar.

Another object of this invention is to provide a sharpening device which will be capable of sharpening substantially all chain saw chains.

Still another object of this invention is to provide a sharpening device in accordance with the preceding object and including adjustment features thereof enabling the cutting teeth of the chain to be bevelled as desired so as to adapt the chain saw to cut various different types of timber.

Another important object of this invention is to provide a chain saw sharpening device including means by which the depth gauges of the chain saw may also be uniformly filed.

A still further object of this invention is to provide a chain saw sharpening device that will enable both the cutting teeth and the depth gauges of an associated chain saw chain to be filed as desired and with all the cutting teeth filed in the same manner and all of the depth gauges filed in the same manner.

A final object of this invention to be specifically enumerated herein is to provide a chain saw sharpening device which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
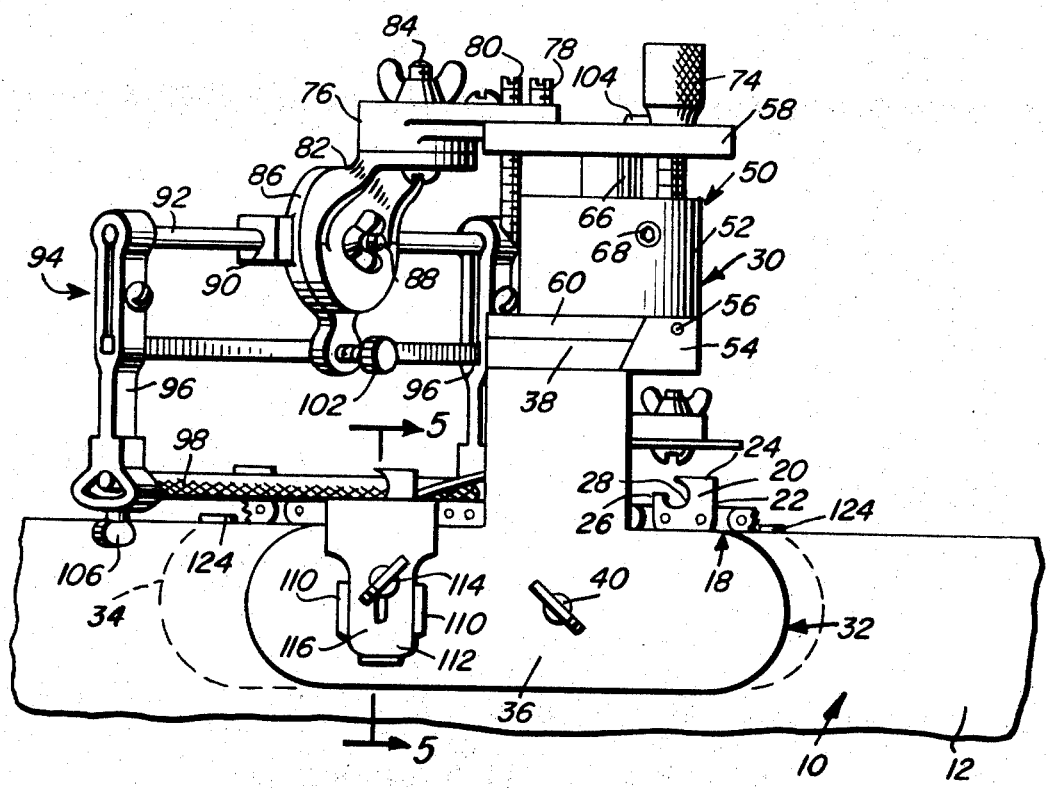
FIG. 1 is a fragmentary side elevational view of a chain saw bar having a saw chain operatively associated therewith and with the chain saw sharpening device of the instant invention mounted on the bar and in position to sharpen one of the cutting teeth of the saw chain.

Referring now more specifically to the drawings, the numeral 10 generally designates a conventional chain saw including a bar 12 having a peripheral groove 14 in which the guide tongues 16 of a chain saw chain referred to in general by the reference numeral 18 are slidingly and guidingly received.

Conventionally, the chain 18 includes longitudinally spaced opposite side cutter links 20 and 22 and each link 20 and 22 includes a cutting tooth 24 and a depth gauge 26. The leading edges 28 of the cutting teeth 24 are bevelled inwardly and rearwardly and these bevelled edges comprise cutting edges which become dull through use and must be resharpened in order to restore the cutting ability of the chain saw chain 18. In addition, after the edges 28 have been sharpened three or four times, it becomes necessary to reduce the height of the depth gauges 26 and these are therefore reduced in height by filing in order that the cutting teeth will cut into the wood being cut the proper distance during each cutting pass.

The sharpening device of the instant invention is referred to in general by the reference numeral 30 and includes a generally U-shaped base 32 comprising a pair of side plates 34 and 36 interconnected along one pair of corresponding edge portions by means of a bight portion 38 secured to and extending therebetween. The base 32 is positioned relative to the bar 12 with the latter received between the plates 34 and 36 and clamped in position by means of a setscrew 40 threadedly secured through the plate 36 and clampingly engaged with the bar 12.

A mounting plate 42 is also secured between the plates 34 and 36 below the bight portion 38 and a longitudinally slotted end of a chain tooth abutment and chain positioning leaf spring 44 is attached to the mounting plate 42 by means of a threaded fastener 46.

Figure 4:
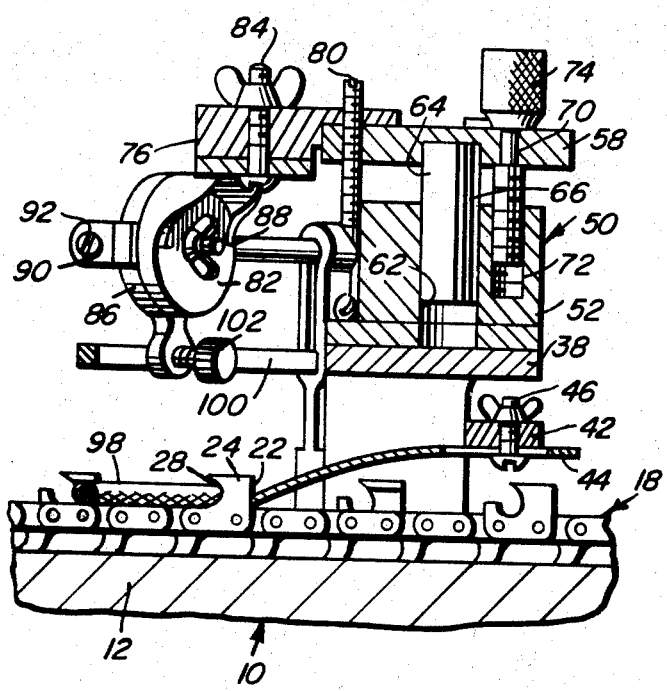
FIG. 4 is a fragmentary vertical sectional view taken substantially upon the plane indicated by the section line 4—4 of FIG. 3.
Figure 5:
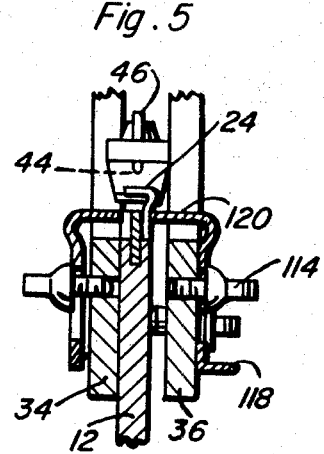
FIG. 5 is a somewhat enlarged transverse vertical sectional view taken substantially upon the plane indicated by the section line 5—5 of FIG. 1.

A support arm referred to in general by the reference numeral 50 includes a first base end 52 pivotally supported between a pair of opposite side upstanding mounting flanges 54 carried by the bight portion 38 by means of a pivot fastener 56 and a second end 58 supported from and shiftable relative to the base end 52 toward and away from the bight portion 38. The base end 52 includes a plate portion 60 through which the pivot pin or fastener 56 extends and which is abuttingly engageable with the bight portion 38 in the manner illustrated in FIGS. 1 and 4 of the drawings. The base end 52 further includes a bore 62 in which a guide pin 64 carried by the second end 58 is slidingly received and the pin 64 includes a longitudinal groove 66 in which the inner end of a setscrew 68 supported from the base end 52 is slidingly received. Also, a screw shaft 70 is journalled from the second end 58 and threadedly engaged in a threaded bore 72 formed in the base end 52 of the support arm 50. Accordingly, the second end 58 may be extended and retracted relative to the base end 52 by oscillating the screw shaft 70 by means of manual torque applied to the knob 74 carried by the upper end of the screw shaft 70 and disposed above the second end 58.

A support bracket 76 is supported from the second end 58 by means of suitable fasteners 78 and a third fastener 80 is secured through the support bracket 76 and the second end 58 and is registered with the outer cylindrical surface of the base end 52 whereby the fastener 80 may have its lower end registered with certain indicia (not shown) to be applied to the outer surface of the base end 52 for reference purposes.

A support head 82 is supported from the support bracket 76 for adjusted angular displacement about a vertical axis by means of the pivot fastener 84 and a mount 86 is supported from the support head 82 for adjustable positioning about a horizontal axis by means of the fastener 88. The mount 86 includes a horizontal transverse bore 90 disposed generally normal to the fastener 88 and a cylindrical mounting rod 92 of a file support assembly referred to in general by the reference numeral 94 is slidingly and rotatably received through the bore 90. The assembly 94 includes opposite end upstanding members 96 whose upper ends are secured to the opposite ends of the rod 92 and between whose lower ends the opposite ends of an elongated file 98 are supported. In addition, an abutment bar 100 is secured between the mid-portions of the opposite end members 96 and the mount 86 includes a threaded abutment screw 102 engageable with the abutment bar 100 for limiting oscillation of the rod 92 in a first direction with the assembly 94 disposed substantially upright.

The knob 74 carried by the screw shaft 70 is provided with a radial pointer 104 for registry with certain indicia 106 defined on the upper surface of the second end 58 of the support arm 50 and it will be noted that the lower ends of the uprights 96 include setscrews 106 by which the opposite ends of either the file 98 or other files may be clampingly supported from the file support assembly 94.

The plates 34 and 36 include upstanding guides 110 between which slotted clamp plates 112 and 113, respectively, are secured by means of threaded fasteners 114 secured through the slot 116 formed in each plate and threadedly engaged in the corresponding side plate of the base 32. The lower end of the plate 113 is provided with a tang 118 to facilitate vertical shifting of the plate 113 when the fasteners 114 are loosened and the upper ends of the plates 112 and 113 include inwardly directed positioning and clamping tongues 120 for engagement with the corresponding side link of the chain 18. The plate 112 carried by the side plate 34 is first adjusted horizontally laterally of the bar 12 according to the width of the chain by means of its fastener 114 and then the fastener 114 for the plate 113 is tightened after the fastener 40 has been tightened to secure the device 30 on the bar 12 in order that the chain 18 be held stationary against lateral deflection.

Figure 2:
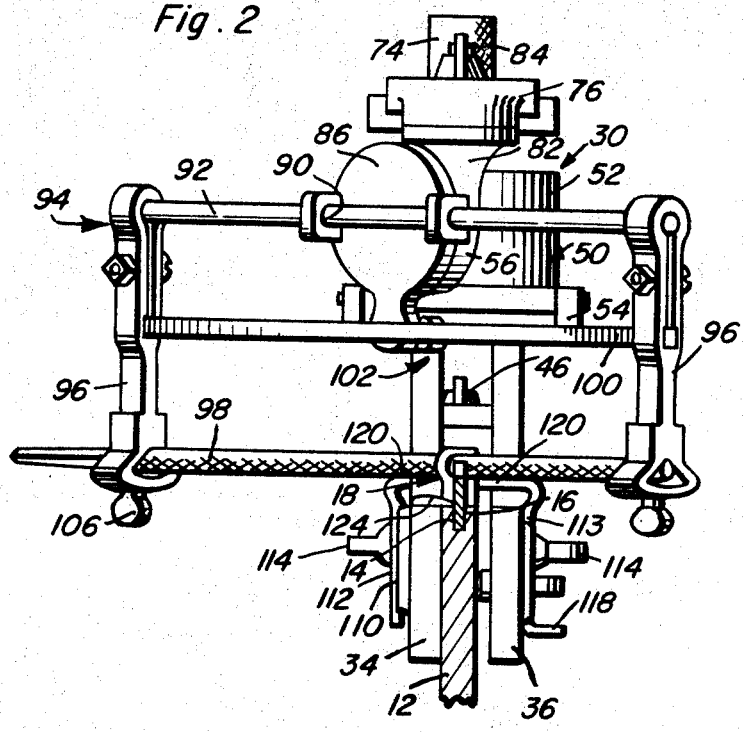
FIG. 2 is an end elevational view of the assemblage in FIG. 1 as seen from the left side thereof.
Figure 3:
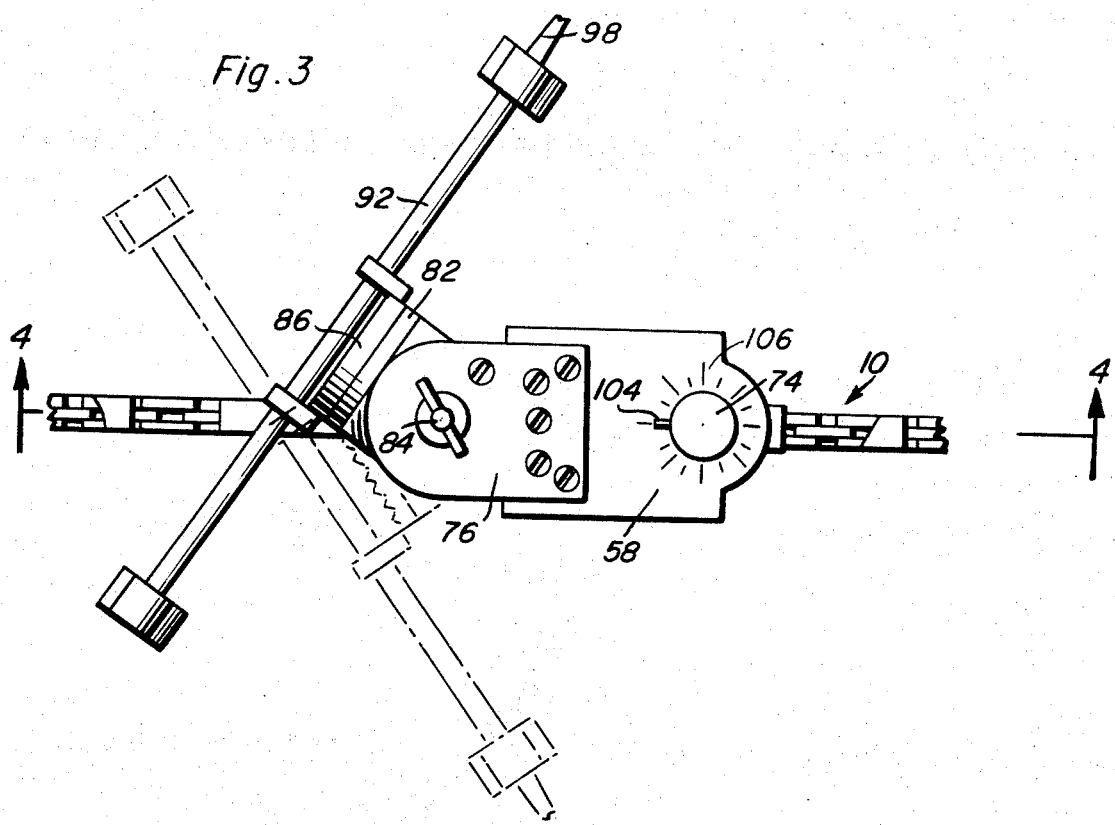
FIG. 3 is a top plan view of the assemblage illustrated in FIG. 1 and with an alternate position of the file supporting structure of the sharpening device illustrated in phantom lines.

In operation, after the sharpening device 30 has been mounted upon the bar 12 with the side links of the chain 18 resting upon the upper marginal edge portion of the bar 12, the height of the file supporting assembly 94 and thus the file 98 may be adjusted by turning the knob 74. Then, the chain 18 may be advanced toward the right as viewed in FIG. 2 of the drawings until the end of the leaf spring 44 remote from the mounting plate 42 engages the lower portion of the rearward edge of one of the cutting teeth 24. Then, according to what side of the chain 18 the cutting tooth engaged with the leaf spring 44 is disposed, the support head 82 may be adjusted relative to the support bracket 76 by loosening of the fastener 84, turning the head 82 to the correct position and then retightening the fastener 84. Thereafter, the angulation of the mount 86 relative to the support head 82 may be adjusted as desired and the file support assembly 94 may be caused to reciprocate in order to lengthwise advance the file 98 across the bevelled edge 28 of the adjacent cutting tooth 24. The abutment screw 102 may be adjusted so as to limit swinging movement of the lower end of the file support assembly 94 toward the cutting tooth being sharpened and thus the amount of material to be removed from the cutting tooth. After the first cutting tooth has been filed, the next cutting tooth on the same side of the chain is filed in a similar manner and thereafter the remaining cutting teeth on that side of the chain. Then, the file support assembly 94 may be swung to an out-of-the-way position and the support arm 50 may be swung back away from the last sharpened tooth so as to enable the support head 82 to be changed in position from the solid line position thereof illustrated in FIG. 3 of the drawings to the phantom line position in FIG. 3 thereby inclining the file 98 in a manner adapting the latter to sharpen the cutting teeth on the other side of the chain.

The confronting faces of the support bracket 76 and support head 82 are planar, but may be serrated, if desired. However, finer adjustments may be obtained in the angular positioning of the support head 82 relative to the support bracket 76 if the confronting surfaces are maintained planar. Further, the opposing surfaces of the support head 82 and mount 86 are also planar, although these surfaces may also be serrated, if desired.

With attention again invited to FIGS. 1 and 2 of the drawings, it may be seen that the opposite ends of the plate 34 include a pair of upper marginal edge portion supported horizontally outwardly projecting abutments 124 against whose undersurfaces the upper edge portion of the bar 12 on the adjacent side of the slot or groove 14 abuts. In this manner, with the sharpening device 30 positioned relative to the bar 12 in exactly the same manner each time the sharpening device 30 is utilized, a more precise sharpening of the chain 18 with a minimum amount of removal of material from the chain 18 by the file 98 may be accomplished.

Further, in order to further insure continuity in sharpening the edges 28, the upper or second end 58 of the support arm 50 is vertically adjustable by means of the knob 74 in order to enable the heighth of the file 98 to be adjusted relative to the bar 12 and teeth 24, independent of a change in the angle of the file 98 relative to the bar 12 and teeth 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A chain saw sharpening device including a base defining a reference plane and including means for removably stationarily supporting said base from the bar of a chain saw with the bar disposed in a plane coinciding with said reference plane, an elongated support arm supported at one end from said base for oscillation about a first axis normal to said arm and said plane, the other end of said arm having a support head supported therefrom for adjustable oscillation about a second axis generally paralleling the arm and lying in said reference plane, and a mount supported from said head for adjustable angulation about a third axis intersecting with said second axis and disposed at right angles relative thereto, an elongated file support assembly including means for stationarily supporting an elongated file therefrom with said file extending longitudinally of said file support assembly, and means supporting said assembly from said mount for oscillation about and guided shifting along a fourth axis extending longitudinally of said support assembly and disposed to one side of said arm, said means for supporting a file from said support assembly including means for supporting said file in a position laterally spaced from said fourth axis, said support assembly including means defining a straight longitudinal guide surface paralleling said fourth axis, and an abutment stop supported from said mount and engageable by said guide surface to limit angular displacement of said assembly in one direction about said fourth axis, said abutment stop being supported from said mount for adjustable positioning laterally of said fourth axis toward and away from said arm.

2. The combination of claim 1 wherein said arm is longitudinally extendible and includes adjustment means operative to adjust and maintain the length of said arm.

3. The combination of claim 1 wherein said base defines an inverted U-shaped member including opposite side upstanding flanges interconnected at their upper edge portions by means of a bight portion extending therebetween and with said reference plane generally centered between said flanges, said base being adapted to be downwardly displaced over said bar with the latter loosely embraced between said flanges and said bight portion spaced above the upper region of the chain extending along the upper marginal edge of said bar.

4. The combination of claim 3 including an elongated leaf spring extending through said base between said flanges and supported at one end from said base below said bight portion for adjustable longitudinal shifting relative to said base, the other end of said spring being adapted to be abutted by a cutting tooth projecting upwardly from said chain.

5. The combination of claim 3 wherein said arm is longitudinally extendible and including adjustment means operative to adjust and maintain the length of said arm.

6. The combination of claim 3 wherein one of said flanges has a through clamp screw threadedly engaged therewith for clamping said bar between said clamp screw and the other of said flanges.

7. The combination of claim 3 wherein the upper edge portions of said flanges include clamps adapted to clampingly engage the adjacent portion of an associated chain saw chain therebetween.

8. The combination of claim 7 including an elongated leaf spring extending through said base between said flanges and supported at one end from said base below said bight portion for adjustable longitudinal shifting relative to said base, the other end of said spring being adapted to be abutted by a cutting tooth projecting upwardly from said chain.

* * * * *